United States Patent [19]
Hauck

[11] 3,892,912
[45] July 1, 1975

[54] ELECTRICAL CONDUIT CONTAINING ELECTRICAL CONDUCTORS

[75] Inventor: Edgar Hauck, Konigsberg, Bavaria, Germany

[73] Assignee: Frankische Isolierrohr-und Metallwaren Werke Gebr. Kirchner, Konigsberg/Bavaria, Germany

[22] Filed: Dec. 13, 1973

[21] Appl. No.: 424,613

[30] Foreign Application Priority Data
Dec. 15, 1972  Germany............................ 2261530

[52] U.S. Cl.............. 174/68 C; 174/113 R; 264/174
[51] Int. Cl.²...................... H02G 3/04; B29F 3/10
[58] Field of Search .... 174/68 R, 68 C, 70 R, 70 C, 174/113 R, 115; 264/174

[56] References Cited
UNITED STATES PATENTS

| 1,574,297 | 2/1926 | Lilleberg | 174/115 UX |
| 2,471,752 | 5/1949 | Ingmanson | 264/174 X |
| 3,132,415 | 5/1964 | Johnson et al. | 174/68 C X |
| 3,211,818 | 10/1965 | Beckwith | 264/174 |

FOREIGN PATENTS OR APPLICATIONS

| 1,292,078 | 3/1962 | France | 174/68 C |
| 572,339 | 10/1945 | United Kingdom | 174/68 C |

*Primary Examiner*—Laramie E. Askin
*Attorney, Agent, or Firm*—Michael S. Striker

[57] ABSTRACT

A flexible tube of electrically insulating synthetic plastic material is corrugated and accommodates loosely a core which extends axially of the tube and which is composed of two or more electrical conductors, each of which is electrically insulated from the other.

A method of making the electrical conduit containing electrical conductors consists of continuously extruding a flexible tube formed of electrically insulating synthetic plastic material, and concurrently introducing into the flexible tube a loosely accommodated core which houses therein at least two electrical wire conductors which are electrically insulated from one another. Means for continuously corrugating the flexible tube and means for continuously cooling the extruded tube are also provided.

1 Claim, 2 Drawing Figures

ELECTRICAL CONDUIT CONTAINING ELECTRICAL CONDUCTORS

BACKGROUND OF THE INVENTION

The present invention relates generally to an article of manufacture, and more particularly to a novel electrical conduit containing electrical conductors, as well as a method of and mounting the same.

It is known to provide corrugated tubes of electrically insulating synthetic plastic material which are highly flexible and usually made of a thermoplastic material, such as polyvinyl chloride. They are intended for installation in various structures, for instance in the walls of buildings or the like, and after the structure is completed, electrical conductors in a desired manner are inserted into these tubes. The advantage of this arrangement is that a desired number of electrical conductors (within the capacity of the tube to accommodate them) can be introduced and that the number of conductors can later be increased or decreased, as the case may be. This is of particular importance if, for instance, the conductors or one of them, should have become damaged later on, for instance by driving of nails into the wall, because the damaged conductor can be readily removed and a new one inserted into the tube in its place.

Such tubes are of thin-walled synthetic plastic material and the corrugations may be carried out in various ways, for instance the apex of each corrugation can extend exactly normal to the axial elongation of the tube or it can be inclined so that the corrugations form a helix which extends longitudinally of the tube. In any case, the insertion of the electrical conductors into the installed tubes is quite difficult and time consuming, which of course, makes it expensive.

SUMMARY OF THE INVENTION

It is an object of the present invention to overcome these disadvantages of the prior art.

More particularly, it is an object of the present invention to provide an improved article of manufacture, namely an electrical conduit of the type utilizing a tube, such as mentioned before, which avoids the drawbacks of the prior-art tubes.

In keeping with the above objects and with others which will still become apparent hereafter, one feature of the invention resides in an article of manufacture, namely an electrical conduit, which comprises a flexible tube of electrically insulating synthetic plastic material, this tube being corrugated, and a core loosely accommodated in the tube and extending axially thereof, the core being composed of at least two electrical conductors which are electrically insulated from one another.

The invention avoids the necessity for introducing the conductors later into the tube after the same has been installed in place. The tube can be of any desired length, and the core extends loosely over substantially the same length as the tube. It is merely necessary to remove a portion of the tube at the opposite axial ends of the latter, in order to expose a corresponding portion of the core for access, so that the necessary connections can be made. It is no longer necessary to insert the core into the tube after the latter has been installed in place.

The electrical insulation on the conductors is advantageously in tight frictional engagement with the conductors, surrounding the latter, in a manner which is conventional in the field. Each of the conductors is electrically insulated from the other, and each conductor may be completely separate from the other. However, two or more of the conductors may also additionally be encased in a cover of electrically insulating material, for instance a synthetic plastic material. Again, some of the conductors may be enclosed in such a cover and others may be separate. It is, for instance, possible to have two, three or even five of the conductors which are each electrically insulated from each other and which are jointly surrounded by an additional cover of electrically insulating material, so as to form a bundle.

It is advantageous — and desirable for economic reasons — that the outer cover which connects several of the conductors together into a bundle, be relatively thin, in which case it may be said that the core as a whole is in effect plastically bendable, that is plastically deformable when being bent. The term "plastically deformable when being bent" is intended to characterize the fact that after the core has been bent, it will have little or no tendency to return to its original shape or position. This has a particular advantage, in that it makes it possible to shape the tube and the plastically bendable core therein to the necessary configuration prior to installation of the conduit, and evidently this possibility greatly facilitates the temporary securing of the conduit in place where it is to be installed before the final installation is carried out.

It is advantageous if the core accommodates among its electrical conductors at least one largely plastically bendable wire, or if such a wire is present in addition to the electrical conductors. The wire may be accommodated together with the electrical conductors in the outer cover of electrically insulating material which connects two or more of the conductors to form a bundle. This latter possibility is the most advantageous, except for the possibility of making at least one of the electrical conductors themselves in the form of a plastically bendable wire. In any case, this provision assures that the core will exert little or no springback effect upon the flexible tube, that is once the tube with the core has been bent to a desired configuration, it will remain completely or largely in the shape which it has been given. Evidently, this greatly facilitates the installation.

It is advantageous if the core fills the tube only to a fraction, for instance if it fills only a quarter or one-sixth of the cross-section of the tube, so that later on additional conductors may be inserted, and that the removal and/or replacement of the existing electrical conductors is facilitated.

The present invention is also concerned with a method of making the novel electrical conduit. This method involves the continuous extrusion of a tube of electrically insulating synthetic plastic material, and the continuous insertion of the core into the tube through the extrusion head. Of course, it is clear that the core can be otherwise introduced, for instance the tube can be extruded around the core. Details will become apparent from the subsequent detailed description.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
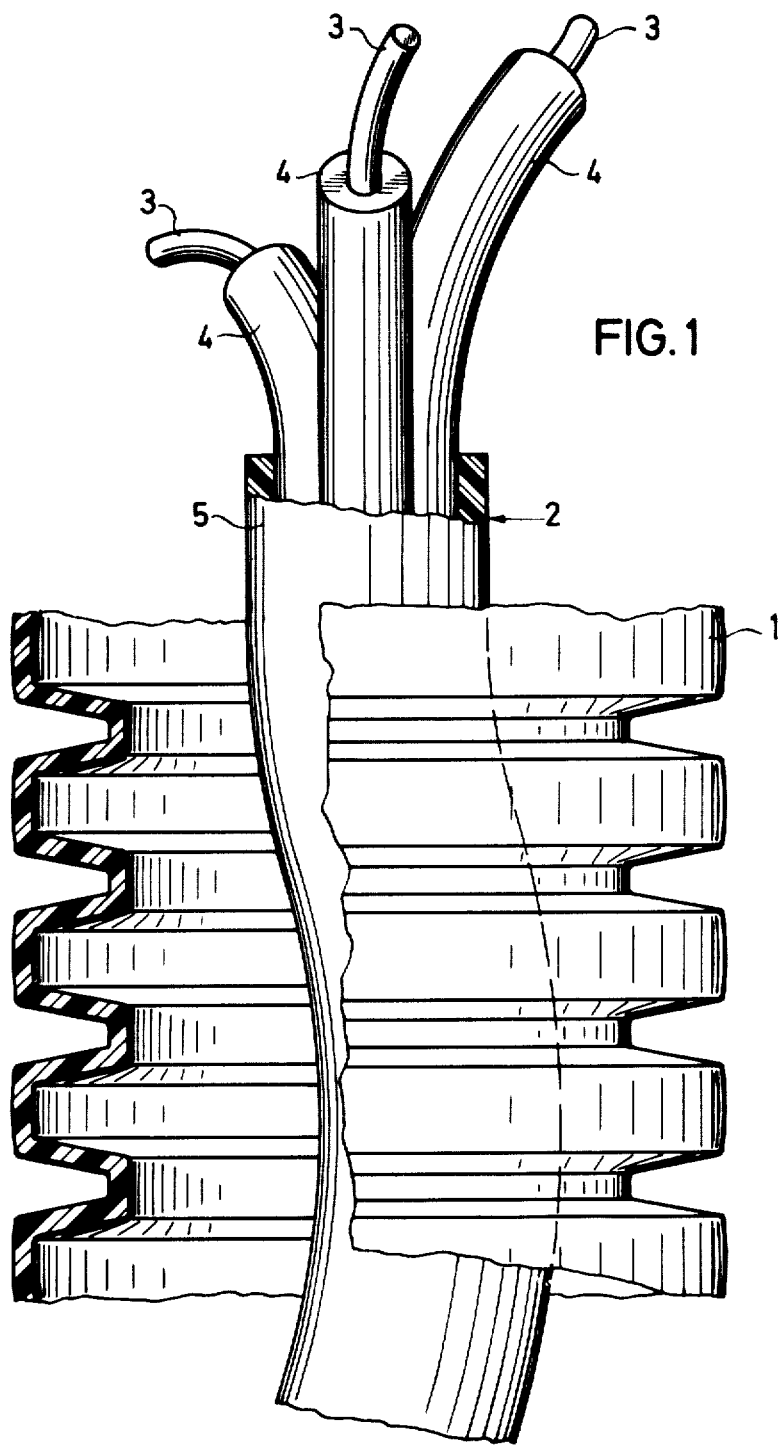
FIG. 1 is a fragmentary axial section of an electrical conduit according to the present invention.

Discussing firstly FIG. 1 it will be seen that reference numeral 2 identifies a core, and reference numeral 1 a flexible tube of electrically insulating synthetic plastic material, for instance polyvinyl chloride. The tube may, for instance, have a diameter of 13 mm., assuming that the core is composed of only two electrical conductors; where it may have a diameter of 16 mm. if the core is for instance composed of five electrical conductors. The wall of the tube 1 is corrugated in circumferential direction, as is shown in the drawing.

The core 2 in the illustrated embodiment has three electrical conductors 3, preferably relatively soft and easily bent copper wires or aluminum wires, and each of these is surrounded by an electrically insulating jacket 4, for instance of thermoplastic material. The three conductors 3 with their jackets 4 are surrounded by a common cover 5 of electrically insulating material, for instance again a thermoplastic material, which tightly engages the jackets 4. The cover 5 is relatively thin to save material, and this has the further advantage that the core 2 has only little tendency to return to its original position once it has been bent. This effect of remaining in a position to which it has once been bent is further improved in that the conductors 3, the jackets 4, and the cover 5 can be made to have freedom of relative axial displacement.

Figure 2:
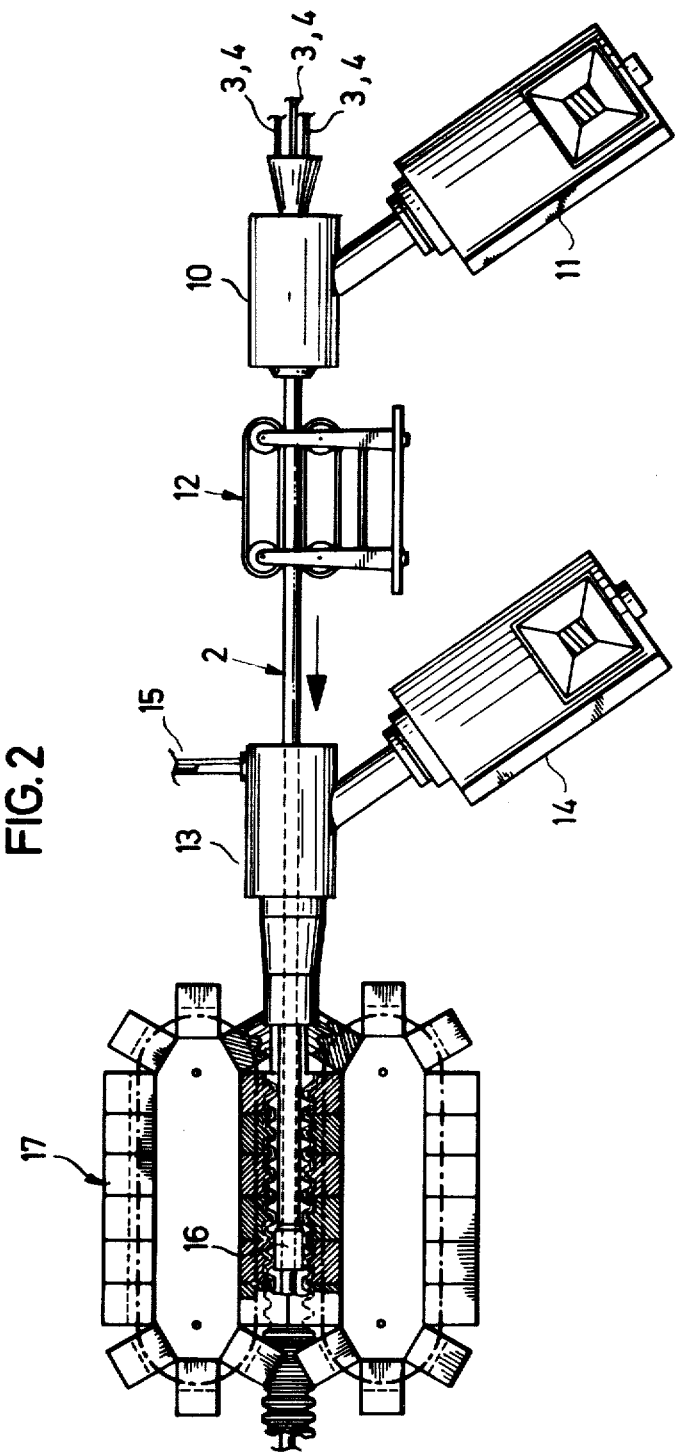
FIG. 2 is a diagrammatic plan view illustrating an apparatus for carrying out the novel method.

An apparatus for carrying out the method according to the present invention is shown in FIG. 2. This apparatus makes it possible according to the present method to continuously extrude the tube and to continuously introduce the conductors into it. Of course, if for any reason desired it is possible to make tube length of 10 or 20 meters into which the core is subsequently inserted. This, however, is not the most advantageous approach, and the method to be described with respect to FIG. 2 is preferred.

FIG. 2 shows a so-called extrusion cross-head 10 which is known from the art of extruders, and which receives an appropriate thermoplastic material having electrically insulating characteristics, for instance polyvinyl chloride, from an extruder 11. The extrusion of plastic materials is too well known to require detailed description.

The electrical conductors 3 which have previously been provided with the jackets 4 are supplied axially to the head 10. Prior to surrounding with the cover 5 they pass through a chamber in which reduced pressure exists, that is partial vacuum, so that after they leave the head 10 and are provided with the cover 5 the latter engages them tightly in the manner of a vacuum-sealed package. This core 2 is withdrawn by a withdrawing arrangement 12 and is supplied to a second extruder cross-head 13 which receives plastified synthetic heated material, for instance, polyvinyl chloride from an extruder 14. The cross-head 13 is provided with a central bore through which the core 2 passes into the extrusion nozzle of the head 13. The central bore is surrounded by a cylindrical gap into which air under pressure is introduced via the inlet 15 which is connected with an appropriate source of compressed air, so that this air passes to and through the outlet nozzle of the head 13.

A member 16 is located at the center of the outlet nozzle, being maintained in place by an axially extending nozzle or the like, and serving to produce between itself and the end of the outlet nozzle of the head 13 a pressurized space, due to the hinderance of the compressed air against free escape past the member 16. This is already known per se from the art of extrusion and assures that the tube of synthetic plastic material which exists from the nozzle of the head 13 is pressed against the inner wall of the deforming elements 17 which are in belt shape and continuously advance, so that in conventional manner a flexible corrugated tube of synthetic plastic material (namely the tube 1 of FIG. 1) is produced.

The core 2 passes through a central bore in the member 16 and in the rod carrying the member 16, whereas the tube 1 is being produced around the member 16 and the rod on which the member 16 is mounted. Thus downstream of the rod, the core will be accommodated lossely in the finished tube 1 and can then be wound together with the same onto a take-up reel or the like. It is now ready for installation.

Inherently, the diameter of the flexible tube 1 can be selected as large or as small as desired. For practical reasons, however, it is advantageous if the smallest diameter is not below 10 mm., and usually it will be chosen to be on the order of 13 mm. The major reason for this is to assure that sufficient room remains in the interior of the tube 1 to permit the introduction of additional conductors at a later time if and when this should become necessary.

Instead of expanding the tube into engagement with the inner surfaces of the elements 17 to corrugate the tube 1, it is also possible (and need not be specifically described because it is well known from the art) to produce a suction between the outer surface of the tube and the inner surface of the elements 17, so as to draw the tube against the inner surfaces by suction.

It will be understood that each of the elements described above, or two or more together, may also find a useful application in other types of constructions differing from the types described above.

While the invention has been illustrated and described as embodied in an electrical conduit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. As an article of manufacture, a cable assembly adapted to be pre-shaped prior to installation in various structures, particularly in the walls of buildings or the like, comprising, in combination, a pronouncedly flexible tube of electrically insulating synthetic plastic material, said tube being corrugated; and at least one plastically deformable shape-holding core loosely accommodated in and fractionally filling a part of said tube and extending axially thereof, said core being composed of at least two electrical conductors, at least one of said conductors being a wire which is substantially plastically deformable during bending, and each of said conductors being provided with a respective jacket of electrically insulating material, and a common cover of electrically insulating synthetic plastically deformable shape-holding material frictionally engaging said jackets and combining said conductors into a bundle, whereby said cable assembly may be pre-shaped by bending said shape-holding core to a predetermined form in which said flexible tube is substantially retained by the presence of said core.

* * * * *